United States Patent
Ono et al.

(10) Patent No.: US 9,644,127 B2
(45) Date of Patent: May 9, 2017

(54) HEATING MEDIUM COMPOSITION FOR SOLAR THERMAL POWER GENERATION SYSTEM

(71) Applicant: Tokyo Ohka Kogyo Co., Ltd., Kawasaki-shi (JP)

(72) Inventors: Takashi Ono, Kawasaki (JP); Yasuo Suzuki, Kawasaki (JP); Salvador Valenzuela Rubia, Seville (ES); Hipolito Lobato Sanchez, Seville (ES); Alfonso Rodriguez Sanchez, Seville (ES); Cristina Prieto Rios, Seville (ES)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 234 days.

(21) Appl. No.: 14/427,758

(22) PCT Filed: Sep. 13, 2013

(86) PCT No.: PCT/JP2013/075394
§ 371 (c)(1),
(2) Date: Mar. 12, 2015

(87) PCT Pub. No.: WO2014/042289
PCT Pub. Date: Mar. 20, 2014

(65) Prior Publication Data
US 2015/0315448 A1 Nov. 5, 2015

Related U.S. Application Data

(60) Provisional application No. 61/701,311, filed on Sep. 14, 2012.

(51) Int. Cl.
*C09K 5/10* (2006.01)

(52) U.S. Cl.
CPC ...................................... *C09K 5/10* (2013.01)

(58) Field of Classification Search
None
See application file for complete search history.

(56) References Cited

U.S. PATENT DOCUMENTS

| 3,231,497 A | 1/1966 | Koch et al. |
| 5,075,022 A | 12/1991 | Gambell et al. |

(Continued)

FOREIGN PATENT DOCUMENTS

| CN | 1541231 A | 10/2004 |
| CN | 101056958 A | 10/2007 |

(Continued)

OTHER PUBLICATIONS

International Search Report in International Application No. PCT/JP2013/075394, mailed Jan. 7, 2014.
Notice of Allowance in Japanese Patent Application No. 2015-513914, mailed Oct. 18, 2016.
Guoqiao Lai, Synthetic Process and Application of Organosilicon Products, Chemical Industry Press, 2nd edition, p. 295, Jan. 2010.
Office Action in Chinese Patent Application No. 201380057226.9, mailed Dec. 2, 2016.

*Primary Examiner* — Necholus Ogden, Jr.
(74) *Attorney, Agent, or Firm* — Knobbe Martens Olson & Bear LLP

(57) ABSTRACT

A heating medium composition for solar thermal power generation system, the heating medium composition including a silane coupling agent represented by formula (1) shown below and a heating medium containing diphenyl ether: (1) wherein each of $OR^1$, $OR^2$ and $OR^3$ may be the same or different, and represents an alkoxy group of 1 to 5 carbon atoms, and X is a group selected from a 3-glycidoxypropyl group, a 3-methacryloxypropyl group, a 3-aminopropyl group, an N-phenyl-3-aminopropyl group and an N-2-(aminoethyl)-3-aminopropyl group.

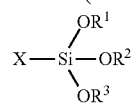

(1)

18 Claims, 2 Drawing Sheets

(56) References Cited

U.S. PATENT DOCUMENTS

| | | |
|---|---|---|
| 5,281,349 A | 1/1994 | Okazaki et al. |
| 2005/0165195 A1 | 7/2005 | Tsuchida et al. |
| 2006/0054564 A1 | 3/2006 | Woyciesjes et al. |
| 2007/0077782 A1* | 4/2007 | Lee .................. H01L 21/02063 438/781 |
| 2010/0252030 A1 | 10/2010 | Marcotte et al. |
| 2011/0159428 A1 | 6/2011 | Lee et al. |
| 2011/0172132 A1 | 7/2011 | Branson et al. |

FOREIGN PATENT DOCUMENTS

| | | |
|---|---|---|
| CN | 101906287 A | 12/2010 |
| JP | A-01-063889 | 4/1989 |
| JP | A-01-261490 | 10/1989 |
| JP | A-05-009465 | 1/1993 |
| JP | A-2011-138133 | 7/2011 |

* cited by examiner

HEATING MEDIUM COMPOSITION FOR SOLAR THERMAL POWER GENERATION SYSTEM

This application is the U.S. National Phase under 35 U.S.C. §371 of International Application No. PCT/JP2013/075394, filed Sep. 13, 2013, designating the U.S., and published in English as WO 2014/042289 on Mar. 20, 2014, which claims priority to U.S. Provisional Application No. 61/701,311, filed Sep. 14, 2012, the entire contents of which are incorporated herein by reference.

TECHNICAL FIELD

The present invention relates to a heating medium composition for a solar thermal power generation system, in which the heating medium is not decomposed in a pipe, thereby preventing deterioration of the pipe.

RELATED ART

A concentrated solar power (CSP) system is a power generation method in which solar rays are collected, and a heating medium is heated to drive a turbine, thereby generating electric power. As an example of such a concentrated solar power system, there is known a method in which a collector module composed of a concave mirror for collecting solar rays and a pipe provided at a focus portion of the concave mirror through which a heating medium is allowed to pass is used (see Patent Document 1). In this method, a heating medium is allowed to pass through the pipe for heating, and the heating medium is directed to the generator turbine, and the turbine is driven by the heat energy to generate electricity. The heating medium is cooled down and recycled through the pipe.

As the heating medium for the concentrated solar power system, diphenyl ether, a diphenyl ether/biphenyl mixture, and a polyphenyl ether composition are known (for example, see Patent Documents 2 to 6).

DOCUMENTS OF RELATED ART

Patent Document

[Patent Document 1] U.S. Patent Publication No. 2010/0252030
[Patent Document 2] U.S. Pat. No. 3,231,497
[Patent Document 3] U.S. Pat. No. 3,231,497
[Patent Document 4] U.S. Pat. No. 3,231,497
[Patent Document 5] U.S. Pat. No. 3,231,497
[Patent Document 6] U.S. Pat. No. 3,231,497

SUMMARY OF THE INVENTION

In a concentrated solar power system using a heating medium containing diphenyl ether, there were problems in that a metal deposited on the inner surface of the pipe for the heating medium acts as a catalyst, and diphenyl ether reacts to generate a reaction product and a hydrogen gas, thereby deteriorating the heat transfer fluid and the strength of the pipe (due to hydrogen embrittlement).

FIG. 1 shows a state where diphenyl ether (A) contained in the heating medium 2 within a pipe 1 come into contact with a metal deposited on the inner surface of the pipe 1 to cause a dehydration reaction, thereby generating a reaction product (B) and a hydrogen gas ($H_2$).

When a hydrogen gas is generated from the heating medium 2 as shown in the figure, the hydrogen gas causes hydrogen embrittlement of the pipe 1, which may cause deterioration in the strength of the pipe or breakage of the pipe. Further, there is a possibility that the hydrogen gas and the reaction product generated by the reaction deteriorate the heating medium, thereby deteriorating the heat transfer efficiency by the heating medium.

The present invention takes the above circumstances into consideration, with an object of providing a heating medium composition for a solar thermal power generation system, in which the heating medium is not decomposed in a pipe, thereby preventing deterioration of the pipe.

For solving the above-mentioned problems, the present invention provides a heating medium composition for a solar thermal power generation system, the heating medium composition including a silane coupling agent represented by formula (1) shown below and a heating medium containing diphenyl ether.

[Chemical Formula 1]

(1)

In the formula, each of $OR^1$, $OR^2$ and $OR^3$ may be the same or different, and represents an alkoxy group of 1 to 5 carbon atoms; and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

In the heating medium composition for solar thermal power generation system according to the present invention, the amount of silane coupling agent is preferably 0.1 to 10 parts by weight, relative to 100 parts by weight of the heating medium containing diphenyl ether.

In the heating medium composition for solar thermal power generation system according to the present invention, the heating medium is preferably a diphenyl ether/biphenyl mixture.

The present invention further provides a pipe protection agent for protecting a pipe through which a heating medium containing diphenyl ether is passed, the pipe protection agent including a silane coupling agent represented by formula (1) shown below

[Chemical Formula 2]

(1)

In the formula, each of $OR^1$, $OR^2$ and $OR^3$ may be the same or different, and represents an alkoxy group of 1 to 5 carbon atoms, and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

In the heating medium composition for a solar thermal power generation system according to the present invention, the silane coupling agent forms a film on the inner surface of the pipe, and the heating medium containing diphenyl ether is not decomposed in a pipe, thereby preventing deterioration of the pipe. As a result, the resistance of the solar thermal power generation system can be improved.

MODE FOR CARRYING OUT THE INVENTION

The heating medium composition for a solar thermal power generation system according to the present invention includes a silane coupling agent represented by formula (1) shown below and a heating medium containing diphenyl ether.

[Chemical Formula 3]

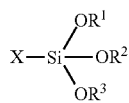

(1)

In the formula, each of $OR^1$, $OR^2$ and $OR^3$ may be the same or different, and represents an alkoxy group of 1 to 5 carbon atoms, and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

In the silane coupling agent, $OR^1$, $OR^2$ and $OR^3$ are not particularly limited as long as they are alkoxy groups, and a methoxy group or an ethoxy group is preferable.

As the silane coupling agent, one kind of compound may be used, or two or more kinds of compounds may be used.

In the present invention, a silane coupling agent represented by formula (1) in which X is a group selected from a vinyl group, a 3-glycidoxypropyl group and an N-phenyl-3-aminopropyl group is preferable, and a mixture of a silane coupling agent represented by formula (1) in which X is a vinyl group and a silane coupling agent represented by formula (1) in which X is a 3-glycidoxypropyl group is more preferable.

In the heating medium composition for a solar thermal power generation system according to the present invention, the amount of the silane coupling agent is not particularly limited. However, for obtaining a sufficient pipe protection effect by the silane coupling agent and reducing the viscosity of the heating medium, the amount of the silane coupling agent relative to 100 parts by weight of the heating medium containing diphenyl ether is preferably 0.1 to 10 parts by weight, more preferably 0.1 to 5 parts by weight.

In the heating medium composition for a solar thermal power generation system according to the present invention, as the heating medium, diphenyl ether itself or a mixture of diphenyl ether and other component(s) can be used.

Examples of the other components which can be mixed with diphenyl ether include biphenyl, biphenyl derivatives and polyphenyl ether. Among these, a diphenyl ether/biphenyl mixture is preferable. When a diphenyl ether/biphenyl mixture is used, the amount of biphenyl within the mixture is preferably within the range of 10 to 40% by weight.

In the heating medium composition for a solar thermal power generation system according to the present invention, apart from the heating medium and the silane coupling agent as essential components, one or more conventional additives for a heating medium may be added if desired.

Figure 1:
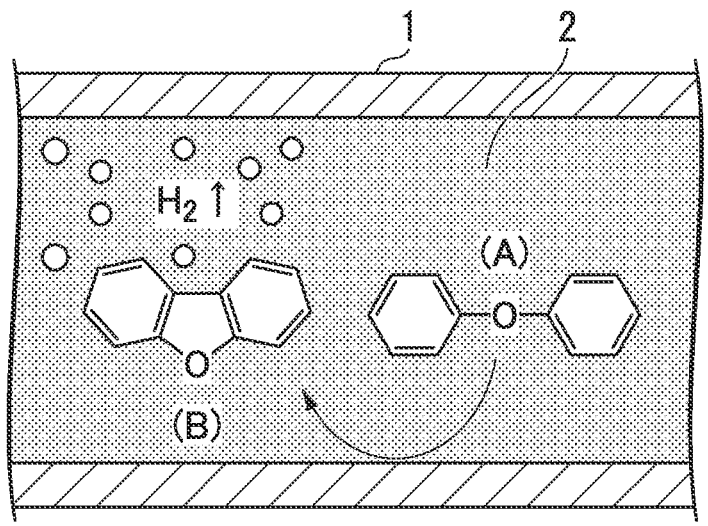
FIG. 1 is a schematic diagram showing a state where diphenyl ether contained in a heating medium within a pipe is subjected to a reaction to generate a reaction product and a hydrogen gas.
Figure 2:
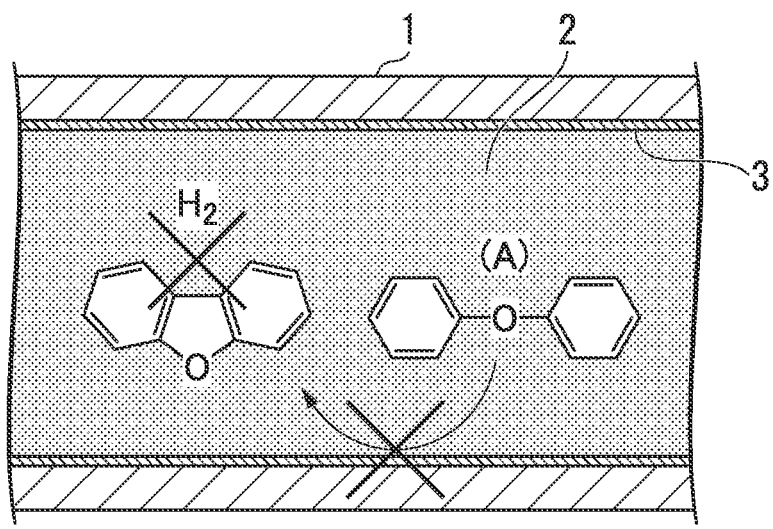
FIG. 2 is a schematic diagram showing a state where a film formed on the inner surface of the pipe prevents diphenyl ether from reacting.

FIG. 2 shows a state where a film 3 formed on the inner wall of the pipe 1 prevent diphenyl ether (A) from reacting.

When the heating medium composition 2 for a solar thermal power generation system according to the present invention is allowed to pass through the pipe 1, a film 3 of the silane coupling agent is formed on the inner wall of the pipe 1. The film 3 prevents diphenyl ether (A) within the heating composition 2 from coming into contact with a metal exposed face on the inner wall of the pipe 1, thereby preventing the reaction of diphenyl ether (A) caused by coming into contact with the metal and the generation of a hydrogen gas by the reaction.

In the heating medium composition for a solar thermal power generation system according to the present invention, the heating medium containing diphenyl ether is not decomposed in a pipe, thereby preventing deterioration of the pipe. As a result, the resistance of the solar thermal power generation system can be improved.

The present invention further provides a pipe protection agent for protecting a pipe through which a heating medium containing diphenyl ether is passed, the pipe protection agent including a silane coupling agent represented by formula (1) shown below.

[Chemical Formula 4]

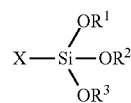

(1)

In the formula, each of $OR^1$, $OR^2$ and $OR^3$ may be the same or different, and represents an alkoxy group of 1 to 5 carbon atoms, and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

As described above in relation to the heating medium composition for a solar thermal power generation system, by adding the pipe protection agent to the heating medium, a film is formed on the inner surface of the pipe, and decomposition of the heating medium containing diphenylether can be prevented from being decomposed within the pipe. Thus, the pipe protection agent can be used to prevent deterioration of the pipe. Alternatively, the pipe protection agent itself or the pipe protection agent dissolved in a solvent other than the heating medium containing diphenyl ether can be allowed to come into contact with the inner surface of the pipe to form a film on the inner surface of the pipe, and the pipe having the film formed can be used in a solar thermal power generation system.

EXAMPLES

As follows is a description of examples of the present invention, although the scope of the present invention is by no way limited by these examples.

Example 1

As the silane coupling agent, 3-glycidoxypropyltrimethoxysilane represented by the following formula (2)

[Chemical Formula 5]

(2)

(trade name: KBM-403; manufactured by Shin-Etsu Chemical Co., Ltd.) was applied to the surface of a stainless steel (SUS304) coupon, and was heated at 120° C. to effect a reaction. Then, the stainless steel coupon was washed with acetone and dried. Thereafter, diphenyl ether was dripped onto the portion where the silane coupling agent was applied, and the contact angle was measured using a contact angle measuring apparatus manufactured by Kyowa Interface Science Co., Ltd. The results are shown in Table 1.

Example 2

With the exception of using 3-methacryloxypropyltrimethoxysilane represented by the following formula (3)

[Chemical Formula 6]

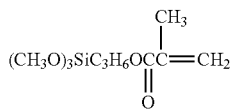
(3)

(trade name: KBM-503; manufactured by Shin-Etsu Chemical Co., Ltd.) as the silane coupling agent, the contact angle was measured in the same manner as in Example 1. The results are shown in Table 1.

Example 3

With the exception of using 3-aminopropyltrimethoxysilane represented by the following formula (4)

[Chemical Formula 7]

(4)

(trade name: KBM-903; manufactured by Shin-Etsu Chemical Co., Ltd.) as the silane coupling agent, the contact angle was measured in the same manner as in Example 1. The results are shown in Table 1.

Example 4

With the exception of using N-phenyl-3-aminopropyltrimethoxysilane represented by the following formula (5)

[Chemical Formula 8]

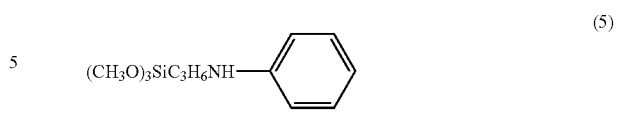
(5)

(trade name: KBM-573; manufactured by Shin-Etsu Chemical Co., Ltd.) as the silane coupling agent, the contact angle was measured in the same manner as in Example 1. The results are shown in Table 1.

Example 5

With the exception of using 3-methacryloxypropyltriethoxysilane represented by the following formula (6)

[Chemical Formula 9]

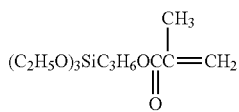
(6)

(trade name: KBE-503; manufactured by Shin-Etsu Chemical Co., Ltd.) as the silane coupling agent, the contact angle was measured in the same manner as in Example 1. The results are shown in Table 1.

Example 6

With the exception of using N-2-(aminoethyl)-3-aminopropyltrimethoxysilane represented by the following formula (7)

[Chemical Formula 10]

(7)

(trade name: KBM-503; manufactured by Shin-Etsu Chemical Co., Ltd.) as the silane coupling agent, the contact angle was measured in the same manner as in Example 1. The results are shown in Table 1.

Comparative Example 1

Without using a silane coupling agent, diphenyl ether was directly dripped onto the surface of a stainless steel coupon washed with acetone, and the contact angle was measured. The results are shown in Table 1.

Comparative Example 2

With the exception of using 3-methacryloxypropylmethyldimethoxysilane represented by the following formula (8)

[Chemical Formula 11]

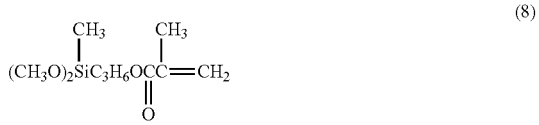
(8)

(trade name: KBM-502; manufactured by Shin-Etsu Chemical Co., Ltd.) as the silane coupling agent, the contact angle was measured in the same manner as in Example 1. The results are shown in Table 1.

Comparative Example 3

With the exception of using 3-methacryloxypropylmethyldiethoxysilane represented by the following formula (9)

[Chemical Formula 12]

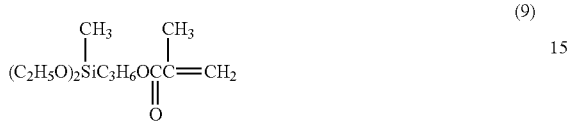

(9)

(trade name: KBE-502; manufactured by Shin-Etsu Chemical Co., Ltd.) as the silane coupling agent, the contact angle was measured in the same manner as in Example 1. The results are shown in Table 1.

Comparative Example 4

With the exception of using N-2-(aminoethyl)-3-aminopropylmethyldimethoxysilane represented by the following formula (10)

[Chemical Formula 13]

(10)

(trade name: KBM-602; manufactured by Shin-Etsu Chemical Co., Ltd.) as the silane coupling agent, the contact angle was measured in the same manner as in Example 1. The results are shown in Table 1.

TABLE 1

| | Silane coupling agent | Boiling point (° C.) | Contact angle (degrees) |
|---|---|---|---|
| Example 1 | (2) | 290 | <10 |
| Example 2 | (3) | 255 | <10 |
| Example 3 | (4) | 215 | <10 |
| Example 4 | (5) | 312 | <10 |
| Example 5 | (6) | 129/5 mmHg | 19 |
| Example 6 | (7) | 259 | <10 |
| Comparative Example 1 | — | — | 24 |
| Comparative Example 2 | (8) | 83/3 mmHg | 23 |
| Comparative Example 3 | (9) | 265 | 22 |
| Comparative Example 4 | (10) | 234 | 20 |

From the results shown in Table 1, it can be seen that, in the case where the silane coupling agent of Examples 1 to 4 according to the present invention was applied to the stainless steel coupon, the contact angle was reduced, as compared to the case of Comparative Example 1 using no silane coupling agent. These results indicate that, by the formation of a film, diphenyl ether is less likely to come into contact with the metal surface.

On the other hand, in the case of using the silane coupling agents of Comparative Examples 2 to 4 which had only two alkoxy groups, the contact angle was about the same level as in Comparative Example 1.

The silane coupling agent were used to prepare mixtures with thermal oil (eutectic diphenyl and diphenyl-ether (c) having the composition: 0.02 wt %-9.98 wt %, Each sample was dropped into a crucible and this heated in an open furnace up to 400° C.-450° C. as top temperature range, for 30 minutes approximately.

Thermal stability studies showed, by comparing that decomposition starts at 375° C. approx, which is located 5° C. more than pure eutectic mixture (370° C. approx).

Examples 7 to 9, Comparative Example 5

The components shown in Table 2 were mixed together to obtain heating medium compositions.

TABLE 2

| | Silane coupling agent | Heating medium |
|---|---|---|
| Example 7 | (2) [0.2] | DPO/BP [100] |
| Example 8 | (5) [0.2] | DPO/BP [100] |
| Example 9 | (11) [0.2] | DPO/BP [100] |
| Comparative Example 5 | — | DPO/BP [100] |

In Table 2, the reference characters indicate the following. Further, the values in brackets [ ] indicate the amount (mol %) of the components.

(2): 3-glycidoxypropyltrimethoxysilane represented by the aforementioned formula (2) (trade name: KBM-403; manufactured by Shin-Etsu Chemical Co., Ltd.)

(5): N-phenyl-3-aminopropyltrimethoxysilane represented by the aforementioned formula (5) (trade name: KBM-573; manufactured by Shin-Etsu Chemical Co., Ltd.)

(11): vinyltrimethoxysilane represented by the following formula (11) (trade name: KBM-1003 manufactured by Shin-Etsu Chemical Co., Ltd.)

DPO/BP: a mixture of diphenyl ether and biphenyl (biphenyl content: 27 wt %) (manufactured by Dow Corporation)

[Chemical Formula 14]

$(CH_3O)_3SiCH=CH_2$ (11)

[Evaluation of Thermal Decomposition (1)]

50 g of each heating medium composition of Examples 7 to 9 and Comparative Example 5 was placed in a sample vessel. Then, the sample vessel was placed in an oven and heated at 400° C. or 425° C. for 20 days. Thereafter, the heating medium composition was subjected to a gas chromatography analysis (liquid phase analysis), so as to evaluate the amount of degradated chemicals (wt %). The results are shown in FIG. 3.

Figure 3:
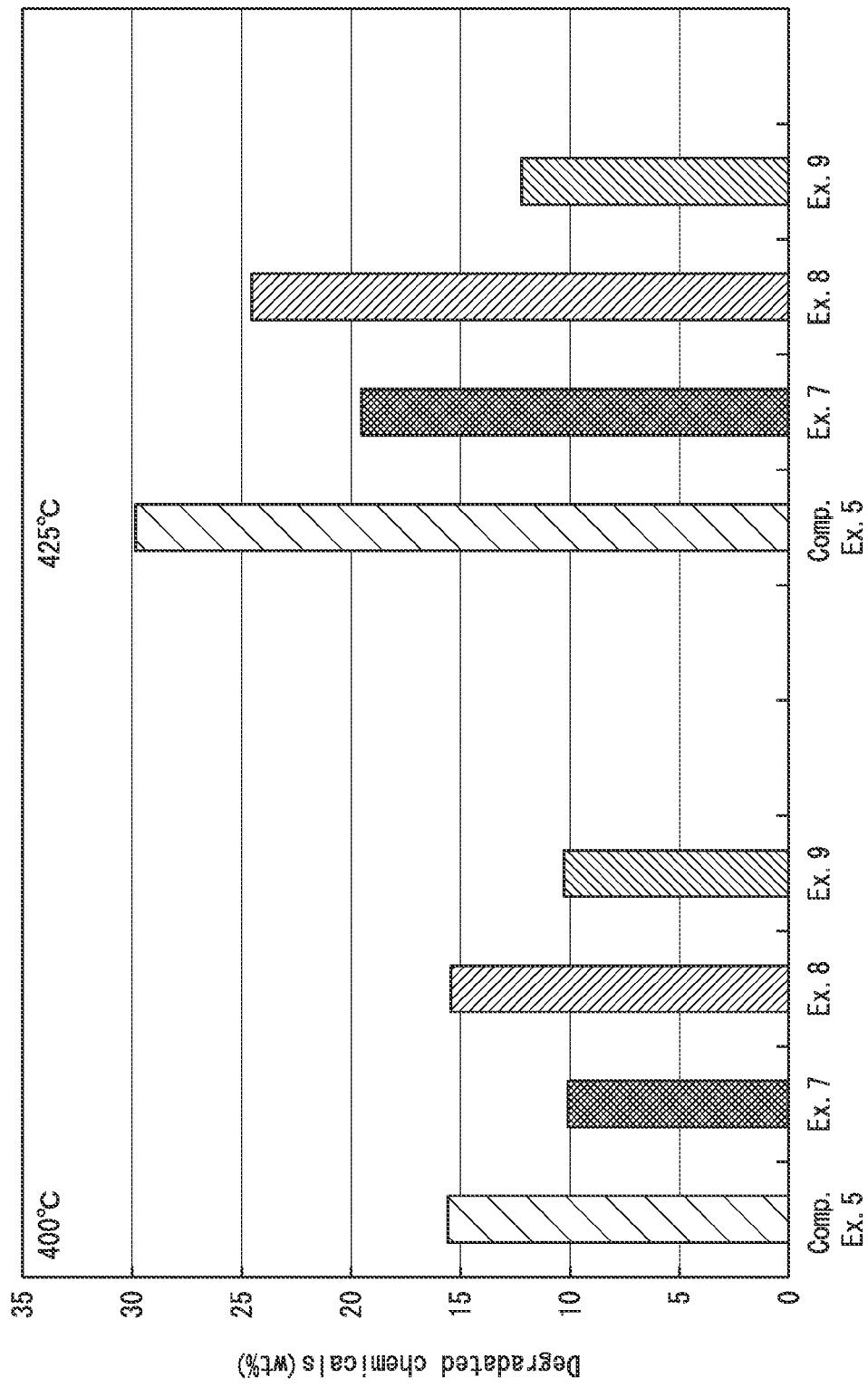
FIG. 3 is a graph showing the results of gas chromatography analysis of heating medium compositions of Examples 7 to 9 and Comparative Example 5.

As seen from the results shown in FIG. 3, after heating at 400° C., the amount of degradated chemicals was about the same in the heating medium compositions of Example 8 and Comparative Example 5, and even smaller in the heating medium compositions of Examples 7 and 9. After heating at 425° C., the amount of degradated chemicals in the heating medium compositions of Examples 7 to 9 was suppressed as compared to that of the heating medium composition of Comparative Example 5. In particular, in the heating medium composition of Example 9 containing a silane coupling agent having a vinyl group, the amount of degradated chemicals after heating at 425° C. hardly increased as compared to the amount of degraded chemicals after heating at 400° C.

Examples 10 to 13

The components shown in Table 3 were mixed together to obtain heating medium compositions.

TABLE 3

| | Silane coupling agent | | Heating medium | Dibenzofuran concentration (ppm) |
|---|---|---|---|---|
| Example 10 | (11) [0.1] | — | DPO/BP [100] | 239 |
| Example 11 | (11) [0.2] | — | DPO/BP [100] | 170 |
| Example 12 | (11) [0.5] | — | DPO/BP [100] | 184 |
| Example 13 | (11) [0.1] | (5) [0.1] | DPO/BP [100] | 138 |

In Table 3, the reference characters are the same as defined above. Further, the values in brackets [ ] indicate the amount (wt %) of the components.

[Evaluation of Thermal Decomposition (2)]

20 g of each of the heating medium compositions of Examples 10 to 13 was applied to the surface of a stainless steel (SUS304) coupon, and then heated at 400° C. for 3 hours with an initial pressure of 10 bar. Thereafter, the heating medium composition was subjected to a gas chromatography analysis, so as to evaluate dibenzofuran concentration (ppm). The results are shown in Table 3.

As seen from the results shown in Table 3, it was confirmed that the dibenzofuran concentration could be significantly reduced in the heating medium composition of Example 11 containing a silane coupling agent having a vinyl bond in an amount of 0.2 wt %. In addition, it was confirmed that the dibenzofuran concentration could be further reduced by using a combination of a silane coupling agent having a vinyl group and a silane coupling agent having a 3-glycidoxypropyl group.

[Evaluation of Film Formation (1)]

20 g of the heating medium composition of Example 13 was applied to the surface of a stainless steel (SUS304) coupon, and then heated at a temperature indicated in Table 4 for 2 hours with an initial pressure of 10 bar. Thereafter, the heating medium composition was subjected to an XPS analysis, so as to evaluate the Si:O ratio and Si concentration of the formed film. The results are shown in Table 4.

TABLE 4

| Heating temperature (° C.) | Si:O ratio | Si concentration (ppm) |
|---|---|---|
| 100 | 1:4.44 | 540 |
| 150 | 1:3.24 | 460 |
| 400 | 1:1.95 | 340 |

As seen from the results shown in Table 4, it was confirmed that a film could be reliably formed

INDUSTRIAL APPLICABILITY

The heating medium composition for solar thermal power generation system according to the present invention is related to a heating medium composition used for a concentrated solar power (CSP) system. In the heating medium composition for a solar thermal power generation system according to the present invention, the heating medium is not decomposed in a pipe, thereby preventing deterioration of the pipe.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF REFERENCE NUMBERS

1. Pipe
2. Heating medium
3. Film

The invention claimed is:

1. A heating medium composition comprising a silane coupling agent represented by formula (1) shown below and a heating medium comprised of diphenyl ether:

(1)

wherein each of OR$^1$, OR$^2$ and OR$^3$ may be the same or different, and represents an alkoxy group of 1 to 5 carbon atoms; and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

2. The heating medium composition according to claim 1, wherein the amount of the silane coupling agent is 0.1 to 10 parts by weight, relative to 100 parts by weight of the heating medium comprised of diphenyl ether.

3. The heating medium according to claim 1, wherein the heating medium is a diphenyl ether/biphenyl mixture.

4. A pipe protection agent comprising a silane coupling agent represented by formula (1) shown below:

(1)

wherein each of OR$^1$, OR$^2$ and OR$^3$ may be the same or different, and represents an alkoxy group of 1 to 5 carbon atoms, and X is a group selected from a vinyl group, an allyl group, a 3-glycidoxypropyl group, a 3-methacryloxypropyl group, a 3-aminopropyl group, an N-phenyl-3-aminopropyl group and an N-2-(aminoethyl)-3-aminopropyl group.

5. The heating medium composition according to claim 1, wherein X is a group selected from a vinyl group, a 3-glycidoxypropyl group and an N-phenyl-3-aminopropyl group.

6. The heating medium composition according to claim 1, wherein the silane coupling agent comprises a mixture of a silane coupling agent represented by formula (1) in which X is a vinyl group and a silane coupling agent represented by formula (1) in which X is a 3-glycidoxypropyl group.

7. The heating medium composition according to claim 2, wherein X is a group selected from a vinyl group, a 3-glycidoxypropyl group and an N-phenyl-3-aminopropyl group.

8. The heating medium composition according to claim 2, wherein the silane coupling agent comprises a mixture of a silane coupling agent represented by formula (1) in which X is a vinyl group and a silane coupling agent represented by formula (1) in which X is a 3-glycidoxypropyl group.

9. The heating medium composition according to claim 3, wherein X is a group selected from a vinyl group, a 3-glycidoxypropyl group and an N-phenyl-3-aminopropyl group.

10. The heating medium composition according to claim 3, wherein the silane coupling agent comprises a mixture of a silane coupling agent represented by formula (1) in which X is a vinyl group and a silane coupling agent represented by formula (1) in which X is a 3-glycidoxypropyl group.

11. The pipe protection agent according to claim 4, wherein the amount of the silane coupling agent is 0.1 to 10 parts by weight, relative to 100 parts by weight of the heating medium comprised of diphenyl ether.

12. The pipe protection agent according to claim 4, wherein the heating medium is a diphenyl ether/biphenyl mixture.

13. The pipe protection agent according to claim 4, wherein X is a group selected from a vinyl group, a 3-glycidoxypropyl group and an N-phenyl-3-aminopropyl group.

14. The pipe protection agent according to claim 4, wherein the silane coupling agent comprises a mixture of a silane coupling agent represented by formula (1) in which X is a vinyl group and a silane coupling agent represented by formula (1) in which X is a 3-glycidoxypropyl group.

15. The pipe protection agent according to claim 11, wherein X is a group selected from a vinyl group, a 3-glycidoxypropyl group and an N-phenyl-3-aminopropyl group.

16. The pipe protection agent according to claim 11, wherein the silane coupling agent comprises a mixture of a silane coupling agent represented by formula (1) in which X is a vinyl group and a silane coupling agent represented by formula (1) in which X is a 3-glycidoxypropyl group.

17. The pipe protection agent according to claim 12, wherein X is a group selected from a vinyl group, a 3-glycidoxypropyl group and an N-phenyl-3-aminopropyl group.

18. The pipe protection agent according to claim 12, wherein the silane coupling agent comprises a mixture of a silane coupling agent represented by formula (1) in which X is a vinyl group and a silane coupling agent represented by formula (1) in which X is a 3-glycidoxypropyl group.

* * * * *